Jan. 12, 1932.  J. SACHS  1,840,979
ELECTRIC METER SERVICE APPLIANCE
Filed July 29, 1930   6 Sheets-Sheet 1

Inventor.
Joseph Sachs
By S. Jay Teller
Attorney.

Jan. 12, 1932.  J. SACHS  1,840,979
ELECTRIC METER SERVICE APPLIANCE
Filed July 29, 1930   6 Sheets-Sheet 2
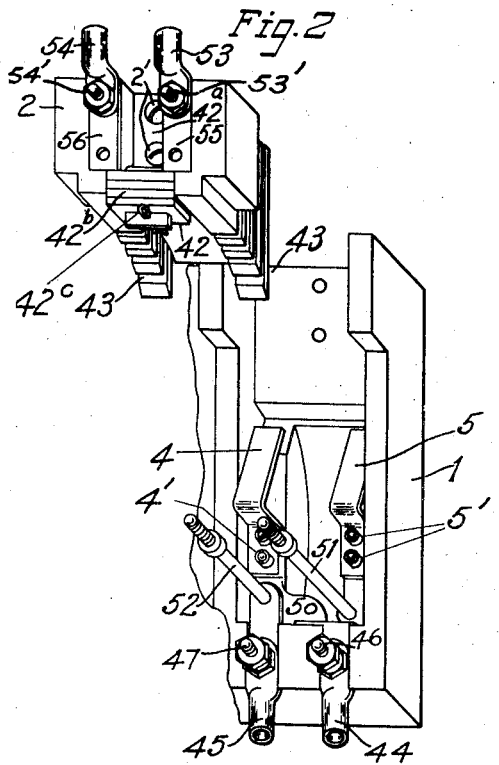
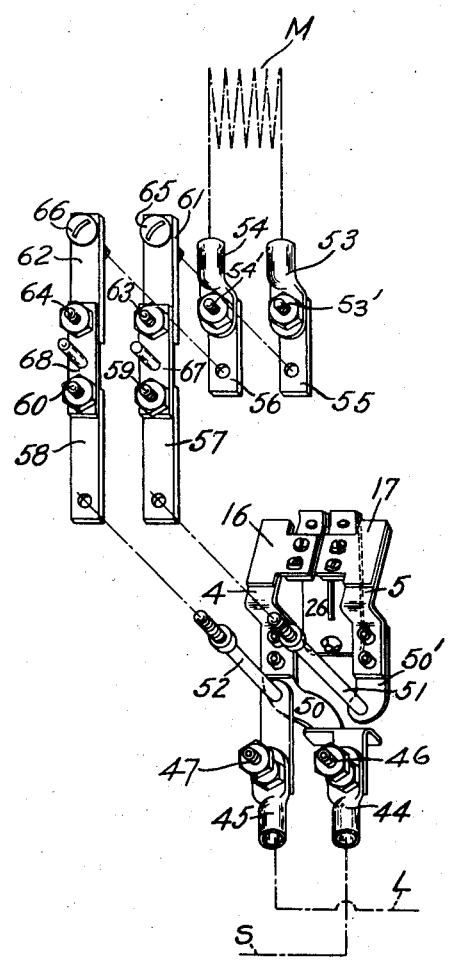
Inventor.
Joseph Sachs
By S. Jay Teller
Attorney.

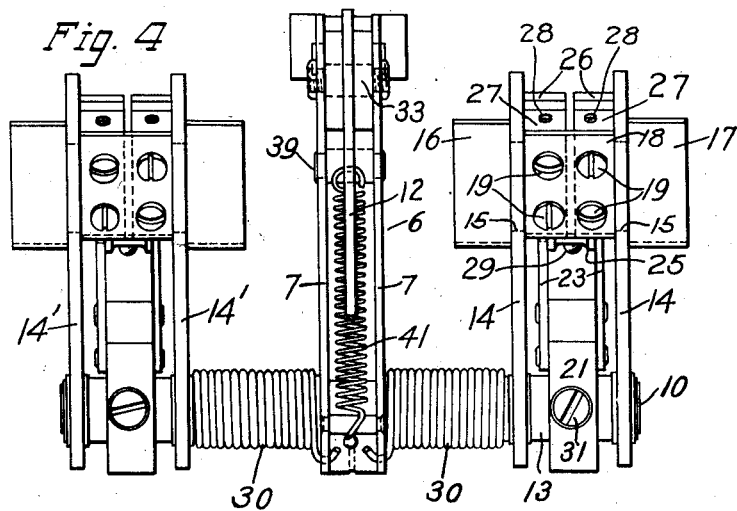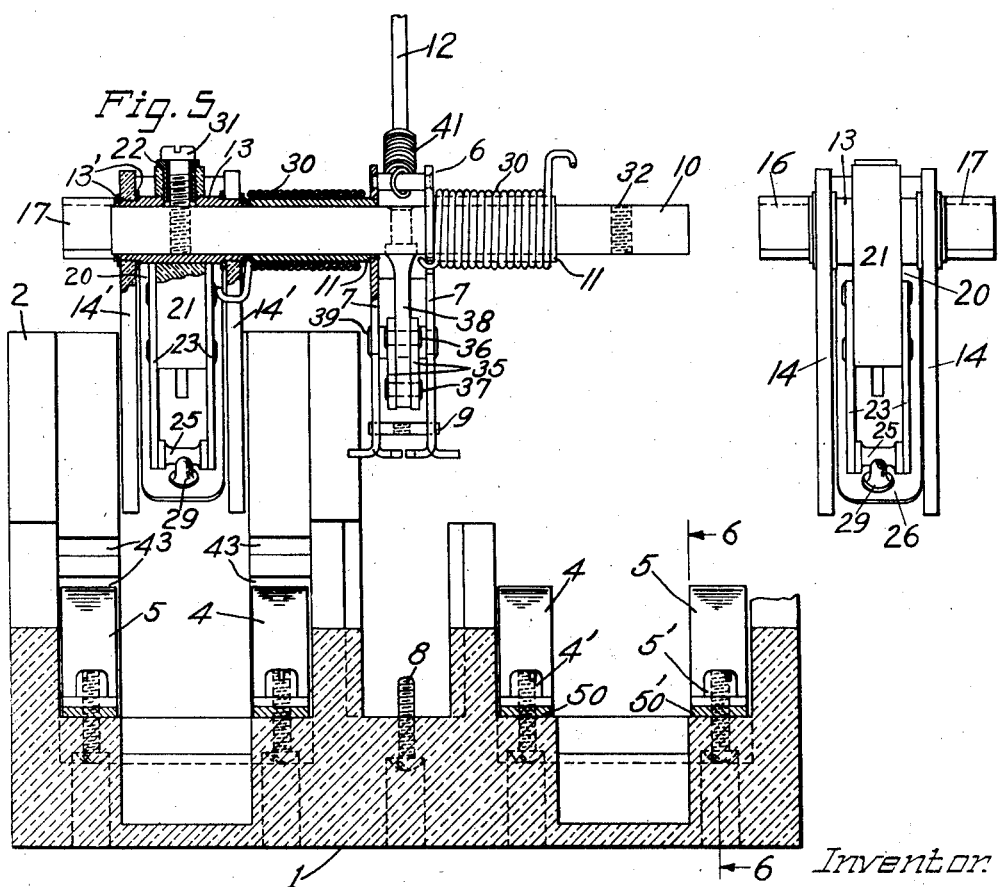

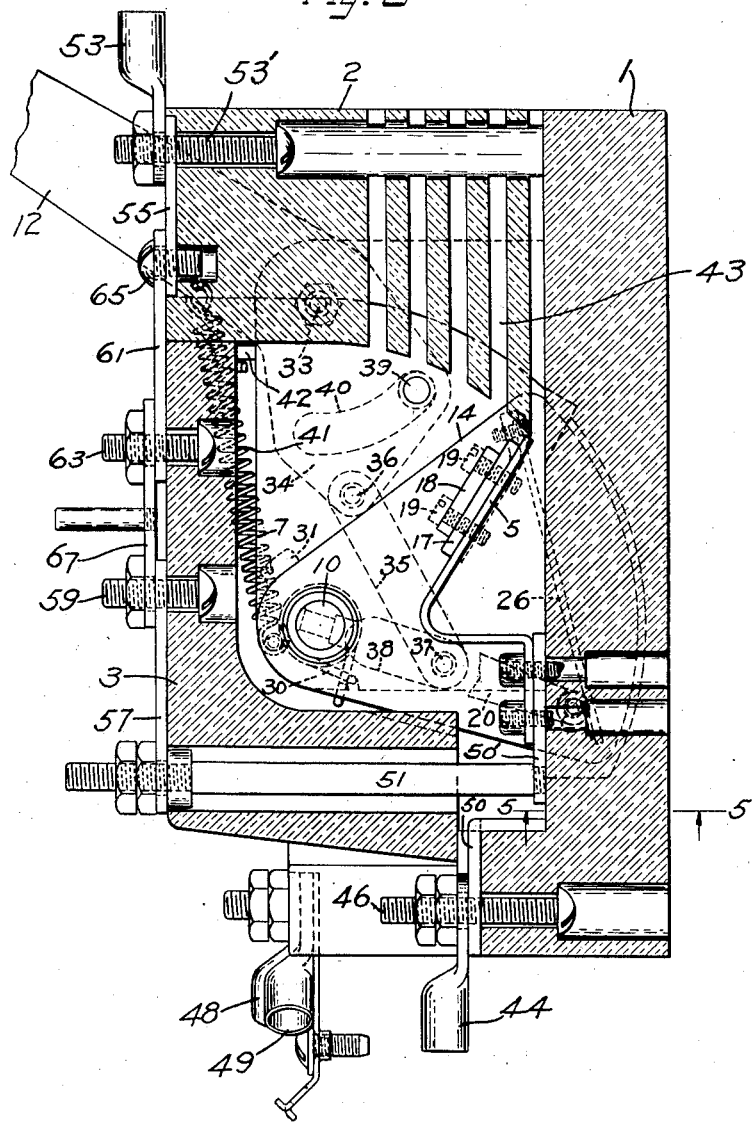

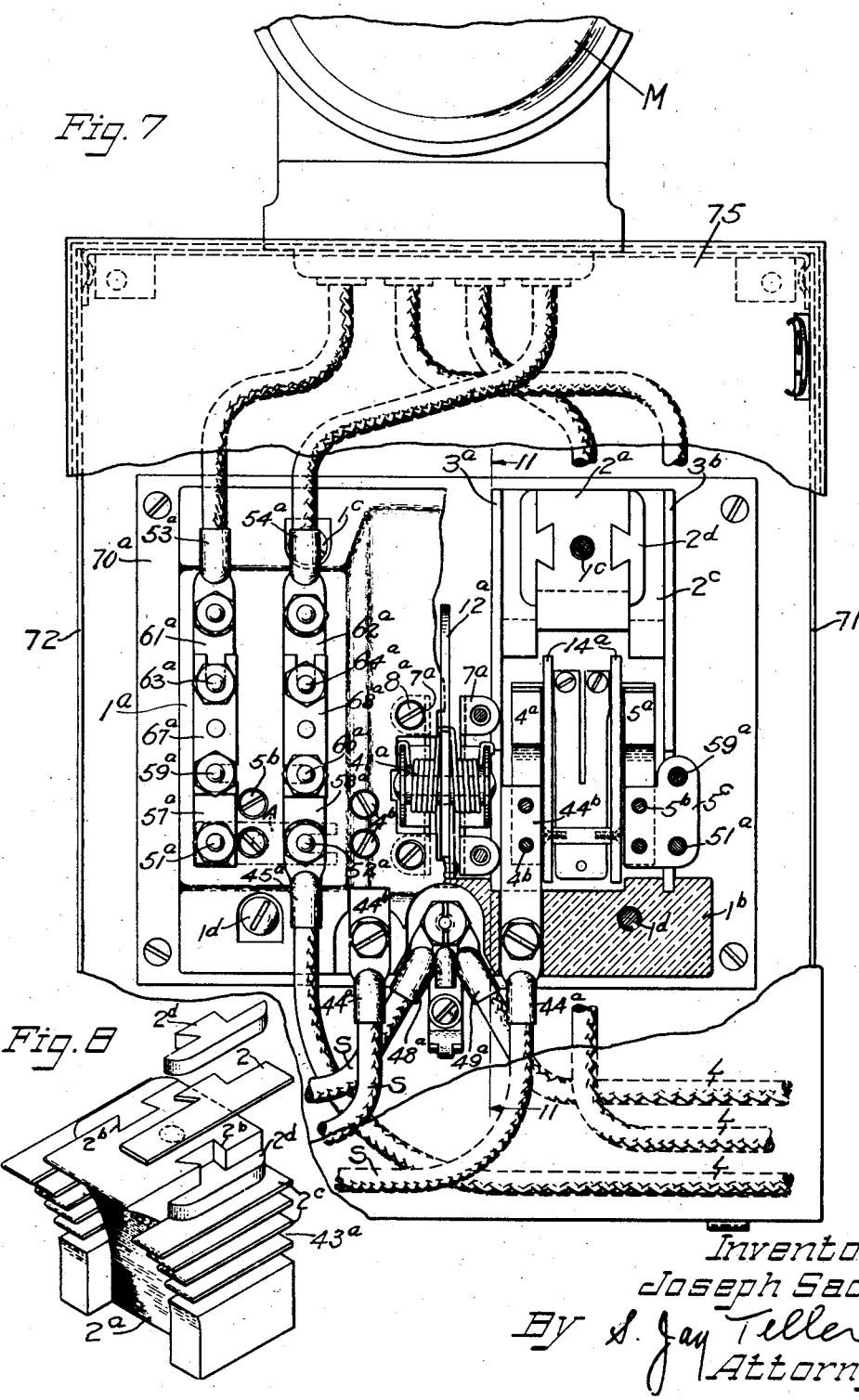

Jan. 12, 1932.       J. SACHS       1,840,979
ELECTRIC METER SERVICE APPLIANCE
Filed July 29, 1930    6 Sheets-Sheet 6
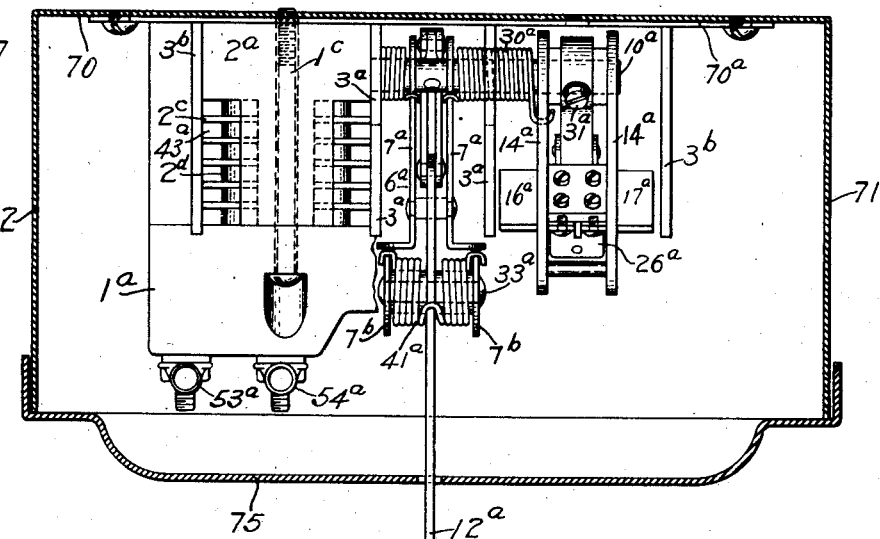
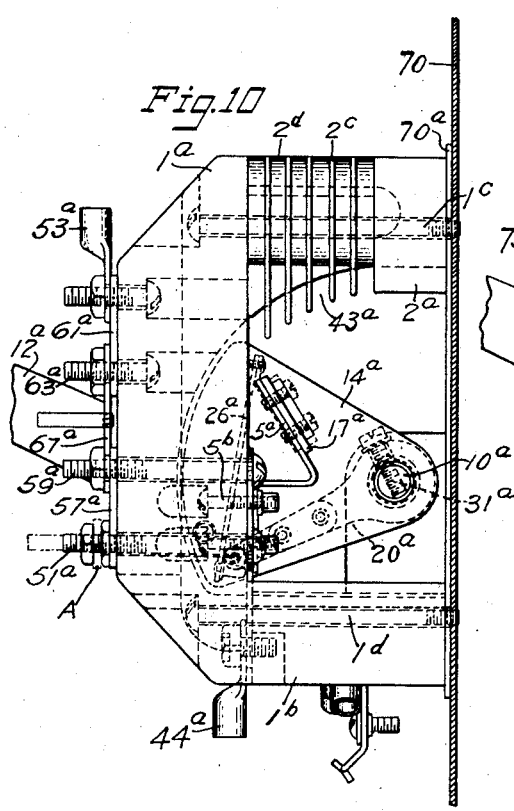
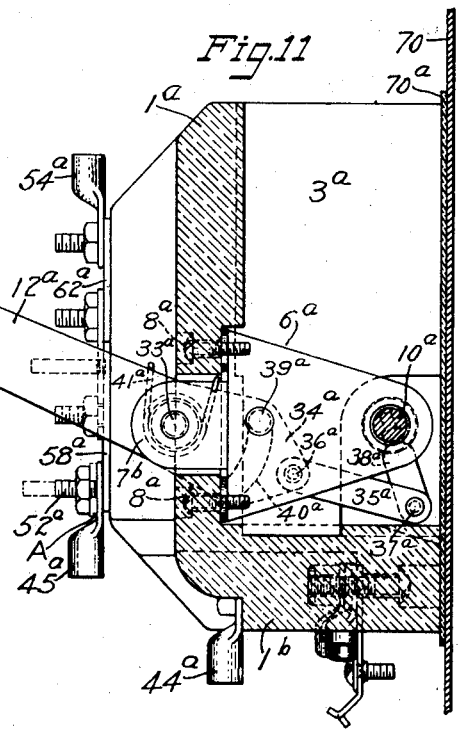
Inventor:
Joseph Sachs.
By S. Jay Teller
Attorney.

Patented Jan. 12, 1932

1,840,979

UNITED STATES PATENT OFFICE

JOSEPH SACHS, OF WEST HARTFORD, CONNECTICUT

ELECTRIC METER SERVICE APPLIANCE

Application filed July 29, 1930. Serial No. 471,527.

The general object of the invention is to provide a meter service installation having the circuit-controlling parts and the meter-testing facilities arranged in a novel manner whereby there is effected a considerable economy of space, whereby manufacturing costs are correspondingly reduced and whereby other important advantages are also obtained. In accordance with the invention there is provided an insulating body normally located at the front of the circuit-controlling means, and the testing facilities are mounted on the said body directly in front of the circuit-controlling means.

A more specific object of the invention is to provide an arrangement wherein the meter-testing facilities are at the front as aforesaid, but wherein access may nevertheless be readily had to the circuit-controlling means for purposes of inspection, adjustment, repair and the like. In accordance with this object of the invention the meter-testing facilities are mounted on a cover which is normally at the front of the circuit-controlling means but is nevertheless readily removable. Disconnectible electrical conducting means are provided for connecting the said meter-testing facilities with other electrical parts of the appliance.

Another more specific object of the invention is to provide, in association with the circuit-controlling means and with the meter-testing facilities, by-pass means which permit different portions of the electrical conducting means of the appliance to be by-passed for purposes of meter testing or for purposes of adjustment and repair of the appliance itself.

Other objects of the invention will be apparent from the following specification and claims.

In the accompanying drawings I have shown two embodiments of the invention in its broader aspects, in each of which the circuit-controlling means is an automatic circuit breaker, such as set forth in my copending application for automatic circuit breakers, Serial No. 443,067 filed April 10, 1930, of which this present application is a continuation-in-part. It will be understood however that the drawings are for illustrative purposes only and are not to be construed as defining or limiting the scope of the invention, the claims forming a part of this specification being relied upon for that purpose. It will be particularly understood that I do not necessarily limit the invention to an automatic circuit breaker of any kind, as the invention is also applicable to an appliance wherein the movable circuit opening and closing member is operable only manually.

Of the drawings:

Fig. 2 is a fragmentary perspective view of certain parts of the appliance shown separately from other parts.

Fig. 3 is a perspective view showing the conducting parts at one side of the appliance.

Fig. 4 is an enlarged front view of the movable parts of the circuit breaker and of the supporting standard therefor.

Fig. 5 is a bottom view of the parts shown in Fig. 4 these parts being separated from the base which is shown in section along the line 5—5 of Fig. 6.

Fig. 6 is a vertical sectional view taken along the line 6—6 of Fig. 5.

Fig. 7 is a front view of a different appliance embodying the invention.

Fig. 8 is a perspective view of one of the arc extinguishing devices constituting a part of the appliance shown in Fig. 7.

Fig. 9 is a plan view of the appliance shown in Fig. 7, the main enclosing cabinet being shown in horizontal section and the main base being broken away at the right so as to show other parts more clearly.

Fig. 10 is a side view of the appliance taken from the right, the right hand baffle plate and the enclosing cabinet being omitted.

Fig. 11 is a vertical sectional view taken along the line 11—11 of Fig. 7.

Figure 1:
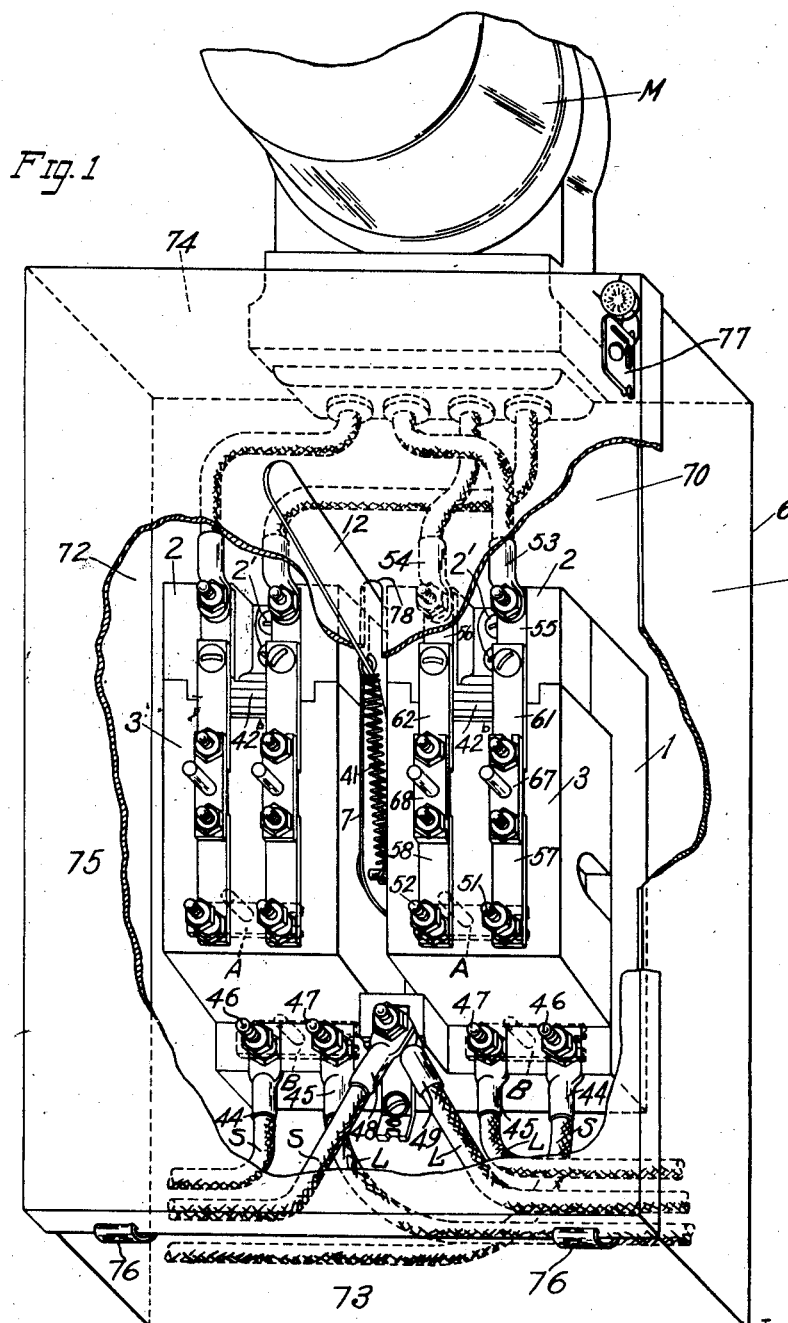
Fig. 1 is a perspective view of an appliance embodying the invention.

The appliance shown in Figs. 1 to 6 has two circuit-controlling means adapted to be included in different legs of a circuit and arranged for operation by a single operating means or handle, but as concerns some of the features of the invention it is immaterial whether a plurality of circuit-controlling means be provided or only one. The appliance is shown as having two circuit breaker mechanisms operable manually and automatically and enclosed in a cabinet. The appliance has testing facilities and other features adapting it for meter service.

As shown in Figs. 1 and 2 there is provided a main insulating base 1 on which all of the parts of the appliance may be mounted. Normally disposed at the front of each circuit-controlling means is an insulating body which may be a removable cover 3. I have shown two separate covers for the respective circuit-controlling means, but as to this I do not limit myself. A block 2 is preferably carried by the base adjacent each circuit breaker mechanism, and this block is shown as formed separately from the base, although it may be integral therewith if desired. The blocks 2, 2 are held in place by means of screws 2', 2' engaging nuts in holes in the base 1. Each cover 3 preferably comprises a bottom wall and two side walls attached to the main front wall, but as to this I do not limit myself. When the cover has such bottom and side walls it is preferably open at one end and it co-operates with the base 1 and with the corresponding block 2 to substantially entirely close the corresponding circuit breaker mechanism. The two covers at the left and right are preferably interchangeable, although this is not essential.

The circuit-controlling means shown in the drawings will now be described in detail, but as already stated, the present invention is not necessarily limited as concerns the particular form of circuit-controlling means that may be used.

Carried by the base 1 at each side thereof are two stationary electric contacts 4 and 5, these being spaced apart transversely and adapted to be engaged by movable contacts of the corresponding circuit breaker mechanism. Each of the contacts 4 and 5 comprises a flat strip of metal bent as shown and having the contact face thereof located in a transverse plane. The contacts are easily removable, being held in place by means of nuts on screws 4' and 5'.

Referring particularly to Figs. 4 and 5, there is provided a standard 6 which carries all of the movable parts of the appliance. This standard 6 comprises two side plates 7, 7 which are held in spaced relationship to each other. The standard may be secured in place on the base 1 by means of screws 8 extending forward into cross members 9 forming parts of the standard 6.

Carried by the standard 6 is a movable supporting and operating element, and this element is preferably a rotatable shaft 10 supported in bushings 11, 11 projecting laterally from the side plates 7, 7. For moving the shaft 10 there is provided an operating means, which may include a handle 12 pivoted between the side plates 7, 7 and operatively connected with the shaft 10 in a manner to be presently described in detail. The shaft 10 serves as the means for supporting and moving one or more electro-responsive circuit-controlling mechanisms, two such mechanisms being shown in the drawings at opposite ends of the shaft.

Each circuit-controlling structure includes an element 13 in the form of a sleeve adapted to fit over the end of the shaft 10 as shown in Fig. 5. Rotatably mounted on the sleeve 13 is a contact member which includes two spaced side plates preferably formed of insulating material. The plates of the right hand member are indicated at 14, 14 and those of the left hand member are indicated at 14', 14'. The sleeve 13 is reduced in diameter and shouldered at its ends to receive the plates, and washers 13', 13' may be provided at each side of each plate. After assembly the ends of the sleeve are turned or spun outward, as shown in Fig. 5, in order to hold the washers and plates in place.

Two laterally projecting movable contacts 16 and 17 are carried by the contact member at the sides thereof, these contacts projecting laterally from the respective side plates 14, 14 and being adapted to be engaged with and disengaged from the respective stationary contacts 4 and 5 which have already been described. The said contacts 16 and 17 are in the form of metallic plates which project inward through slots 15, 15 in the respective side plates 14, 14. Extending transversely between the two side plates is an insulating bar 18, the ends of which also extend into the said slots 15, 15. The contacts engage the bar 18 at the rear face thereof and are held in place by means of screws 19, 19.

There is provided an actuator 20 for moving or actuating the contact member for normal switching purposes or to effect closing of the circuit after automatic opening thereof. The actuator 20 is rigidly secured to the sleeve 13 so as to be movable about the axis of the shaft when the bushing and shaft are turned. The actuator comprises an insulating element 21 mounted on the sleeve 13 between the plates 14, 14. The element 21 is retained on the sleeve by a small radial bushing 22 extending through registering holes. The actuator also comprises two spaced arms 23, 23 secured to the element 21 and carrying at their outer ends a small roller 25.

There is provided an electro-thermally responsive bi-metallic strip 26 which is adapted to be deflected by reason of the heating action of excess current therein in accordance with the well known action of such bi-metallic strips. This strip is substantially U-shaped and has the legs of the U connected respectively with the movable contacts 16 and 17. There are connecting elements 27, 27 engaged and held in place by the said screws 19, 19, and the end portions of the legs of the strip 26 are provided with holes through which extend screws 28, 28 which detachably hold the strip in place on the connecting elements 27, 27. It will be observed that the strip 26 provides an electrical connection between the two movable contacts 16 and 17, thus completing the circuit through the entire mechanism when the movable contacts 16 and 17 are in engagement with the stationary contacts 4 and 5.

The strip 26 is so shaped and positioned that it serves in and of itself as a latch to hold the contact member and the actuator in normally fixed relationship with each other. For this purpose the strip 26 is provided with a pin 29 adapted to engage the roller 25. Under normal conditions the strip 26 serves to mechanically connect the contact member and the actuator 20, but when the bi-metallic strip is heated by reason of the passage of excess current therethrough it is deflected upward and rearward so as to cause the pin 29 to disengage the roller 25 of the actuator and permit the contact member to move automatically in the counter-clockwise direction so as to separate the contacts 16 and 17 from the contacts 4 and 5 and thus break the circuit at two places.

The contact member of each self-contained structure is biased for movement in the circuit-opening direction, in this case in the counter-clockwise direction, by means of a spring 30 surrounding the corresponding bushing 11. The spring is engaged at one end with the corresponding side plate 7 and at the other end with the inner one of the two spaced side plates 14, 14.

As already stated the self-contained structure that has been described, is readily detachable from its supporting and operating element, that is, the shaft 10. To facilitate detachment the structure is held in place by a screw 31 extending through the bushing 22 and into a threaded hole 32 in the shaft. It will be apparent that after disengaging the spring 30 and removing the screw 31 the entire structure may be entirely removed as indicated at the right in Fig. 5, thus facilitating adjustments, repairs or replacement.

As shown there are two circuit breaker mechanisms arranged to be operated or controlled by means of a single operating member such as the handle 12. The actuators 20, 20 are connected together for movement in unison, all of them being connected with the common operating shaft 10. For purposes of convenience the operating shaft 10 and the actuators carried thereby will be referred to collectively as the actuating member. The operating means for the actuating member is carried by the standard 6 and is located between the two circuit breaker mechanisms. The said operating means has already been referred to as preferably including the handle 12. As shown in Figs. 4, 5 and 6, the handle 12 is pivotally mounted on a pin 33 extending transversely between the side plates 7, 7 of the standard. As shown the handle comprises a single piece of sheet metal which is extended at its inner end as shown at 34. A link 35 is pivotally connected at 36 with the extension 34 of the handle and is pivotally connected at 37 with an arm 38 projecting radially from the shaft 10. A suitable means is provided for limiting the movement of the handle and there is shown for this purpose a transverse pin 39 extending through an arcuate slot 40 in the handle extension 34. It will be evident that movement of the handle 12 may be transmitted through the link 35 and the arm 38 to turn the actuating member and thus operate the contact members.

As already pointed out the contact members are biased for movement in the opening direction, that is, in the counter-clockwise or opening direction by means of the springs 30, 30. The said contact members are additionally urged in the opening direction by means of the resiliency of the stationary contacts 4 and 5. When the actuating member is in its closed-circuit position as shown in Fig. 6 the two toggle links 34 and 35 occupy the positions shown with the pivotal axis at 36 in front of a straight line connecting the pivotal axes at 33 and 37. Movement of the links toward the front is prevented by the stop pin 39 and thus the two links 34 and 35 constitute a restraining means positively resisting the tendency of the contact members to automatically move in the counter-clockwise or opening direction.

A spring 41 tends to move the handle 12 in the counter-clockwise direction and therefore tends to move the links 34 and 35 in the direction to break the toggle. The said links are held in their locking position by reason of the pressure exerted on the actuating members by the two springs 30, 30 acting through the contact members and the thermal strips 26, 26. Obviously this pressure must be so related to the tension of the spring 41 that it will normally overcome the tendency of the said spring to move the links out of their locking position.

By means of the handle 12 the actuating member and all of the contact members can be moved, while remaining in fixed relationship to each other, to their open-circuit positions. It will be understood that during such movement the thermal strips 26, 26 remain in engagement with the respective actuators 20, 20, and that thus the handle 12 can be used to operate the circuit breaker as a switch to open and close the circuit for ordinary switching purposes. The counter-clockwise movement of each contact member is limited by a stop 42 carried by the corresponding block 2. The stop comprises a metal strap 42ª held in place by the screws 2', 2', and also comprises small blocks 42ᵇ, 42ᵇ of insulating material having holes therein through which the strap 42ª extends to support the blocks. The blocks are retained in place by means of a cotter pin 42ᶜ. When the current in either strip 26 exceeds a predetermined amount the strip will be deflected upward and rearward and will disengage the actuator 20, thus breaking the mechanical connection between the actuator and the contact member. As soon as this mechanical connection is broken the contact member is immediately turned in the counter-clockwise direction under the action of the corresponding spring 30 to the open-circuit position, the circuit being thus broken in two places. It will be understood that the automatic movement of either contact member to its open-circuit position takes place entirely independently of the actuating member and will so take place even though the actuating member be positively held in its closed-circuit position.

As already stated, the spring 41 is of such strength as to be insufficient to break the toggle at 34, 35 when both of the contact members are biased in the opening direction by reason of the action of the springs 30, 30 and of the resilient contacts 4, 4 and 5, 5. However, when either of the thermal strips 26, 26 acts to disengage the actuating member and release the corresponding contact member, the pressure upon the toggle links is reduced. The strength of the spring 41 is such that, upon the reduction of pressure resulting from the electro-responsive release of any one contact member, it immediately acts to move the actuating member and each remaining contact member to their open-circuit positions.

I may make special provision for minimizing arcing between the stationary and movable contacts upon the breaking of the circuit. For this purpose the insulating block 2 is provided at both sides with vertical slots 43, 43, in order to form two series of chambers in close proximity to the respective paths of movement of the movable contacts, these chambers being adapted for receiving and condensing arc-formed gases. The block is provided at its lower face with curved surfaces adjacent and approximately conforming to the arcuate paths of movement of the contacts. The slots 43, 43 terminate at their lower ends at these curved surfaces and at their upper ends preferably terminate at the top surface of the block. It will be obvious that when the circuit is broken by the movement of the contacts 16 and 17 from the closed position shown in Fig. 6, the gases resulting from any arcs that may be formed will pass upward into the slots 43, 43 being thus cooled and dissipated so as to prevent the continuation of the arcing action.

As already pointed out the cover 3 constitutes an insulating body normally disposed at the front of the circuit-controlling means. In accordance with the present invention this insulating body is utilized as the support for certain meter-testing facilities, such facilities ordinarily including means for the by-passing of the meter, means for the interruption of the circuit between the meter and the load wires or between the meter and the service wires or both, and means for the attachment of wires or leads for connecting into the circuit a standard test meter or other testing instrumentalities. The details of the meter-testing facilities constitute no part of the present invention, but I have shown and will describe one construction which is well adapted for the purpose.

On the front of each insulating body or cover 3 there are mounted two vertical straps 57 and 58 held in place by screws 59 and 60. Also mounted on the said insulating body or cover 3 in vertical alignment with the straps 57 and 58 are other vertical straps 61 and 62, held in place by screws 63 and 64. The straps 57 and 58 are spaced from the straps 61 and 62, but they are normally electrically connected therewith by means of removable test links 67 and 68 normally held in place by means of nuts engaging the screws 59, 60 and 63, 64.

Provision is made for connecting the said straps 57, 58 and 61, 62 in circuit with the before described circuit-controlling means and also in circuit with the meter, and when the cover 3 is removable, as is preferred, the construction may be such that the several wire terminals are mounted on the main base 1, disconnectible electrical connections being provided between the said meter-testing facilities on the one hand and the wire terminals and the said circuit-controlling means on the other hand. When there are two separate circuit-controlling means and two separate sets of meter-testing facilities as here shown and described, the parts 58, 68 and 62 which are nearer the center of the appliance are preferably connected on the load side of the meter and the parts 57, 67 and 61 which are nearer the side of the appliance, are preferably connected on the service side of the meter. Preferably the circuit-controlling appliance is connected on the service side of the meter between the incoming service wire and the service side straps 57, 67 and 61.

For the attachment of circuit wires, terminals 44, 44 and 45, 45 may be secured to the lower part of the base 1 by means of nuts on screws 46, 46 and 47, 47 and they are connected electrically with the respective stationary contacts 4, 4 and 5, 5. The terminals 44, 44 may be regarded as adapted for a connection of service wires S, S and the terminals 45, 45 may be regarded as adapted for the connection of load wires L, L. For a three wire circuit there may be additional terminals 48 and 49 adapted for the connection of additional service and load wires forming the third or neutral connection. Wire terminals 53 and 54 are mounted on the front of the block 2, being adapted to be connected respectively with the service and load sides of the meter. The terminals 53 and 54 are electrically connected respectively by means of screws 53′ and 54′ with vertical straps 55 and 56, having threaded holes near the lower ends thereof.

Each stationary contact 4 is connected by means of the offset conductor member 50 with the corresponding wire terminal 44 and the companion stationary contact 5 is connected through a conductor 50′ with a threaded rod 51 which is positioned to extend directly forward through a hole in the front of the corresponding cover 3. The other wire terminal 45 is connected with a threaded rod 52 similar to the rod 51 and similarly extending through a hole in the front of the cover. The rods 51 and 52 extend through and are electrically connected with the aforesaid vertical straps 57 and 58 mounted on the cover, the rods preferably having integral collars thereon which directly engage the rear surfaces of the straps. Nuts on the rods 51 and 52 engage the straps 57 and 58 to provide firm electrical connections and also serve to assist in holding the cover in place. The upper ends of the straps 61 and 62 normally overlap the straps 55 and 56 and are detachably connected thereto by means of screws 65 and 66 entering the threaded holes therein.

From an inspection of Figs. 1 and 3 it will be evident that when the circuit breaker mechanism is in closed position a circuit is established from the service wire terminal 44 through the conductor 50 and through the stationary and movable contacts of the circuit breaker proper to the rod 51. From the rod 51 the circuit extends through the parts 57, 67, 61, 55 and 53 to the meter. From the meter the circuit extends through the parts 54, 56, 62, 68 and 58 to the rod 52, this rod being electrically connected with the load wire terminal 45. When the cover 3 is to be removed, it can be mechanically disconnected, and at the same time the meter-testing facilities can be electrically disconnected, by removing the screws 65 and 66 and by removing the nuts from the rods 51 and 52.

The conductors and links at the front of the cover 3 will be recognized as constituting testing facilities of a well known type. By putting in place a by-pass link between the screws 51 and 52 as indicated by dot-and-dash lines at A in Fig. 1, the current can be by-passed from the service wire to the load wire without going through the meter. It will be observed however that the by-passing between the screws 51 and 52 leaves the circuit breaker in the circuit, thus providing protection for the customer during testing and making it possible to manually control the customer's circuit during testing if desired. One or the other or both of the meter terminals may be freed for testing by removing one or the other or both of the links 67 and 68 in accordance with well known practice. The screws 59, 60 and 63, 64 and the nuts thereon serve as means for the attachment of conductors serving to connect with a standard test meter or other meter testing instrumentalities.

The mounting of the test links and associated conductors directly upon the cover 3 constitutes an important feature of the invention. It is necessary, or at least highly desirable, to completely enclose the circuit breaker mechanism to prevent tampering therewith, the cover 3 being provided for this purpose. By utilizing the cover 3 not only to protect the circuit breaker mechanism, but also to support the test links, I provide not only a considerable economy of space, but also a considerable economy of material and I substantially reduce the cost of manufacture. Without this arrangement the test links and their associated conductors would have to be located either at the side of the circuit breaker proper or at the top or at the bottom thereof, thus making necessary a very much larger enclosing box.

The two screws 46 and 47 are so spaced as to be adapted to receive a by-pass link B shown by dot-and-dash lines in Fig. 1, this link being held in place by nuts on the said screws. It will be obvious that when the link B is in place, current can flow directly from the service wire terminal to the load wire terminal independently of the circuit breaker mechanism. As already described, parts of the circuit breaker mechanism are removable, and with the current by-passed as described the said parts of the circuit breaker mechanism can be removed for adjustment, repair or replacement without interrupting the electrical connection between the service and load wires.

For enclosing the entire appliance I have shown a cabinet 69 of sheet metal having a rear wall 70, side walls 71 and 72 and end walls 73 and 74. The upper end wall 74 preferably has an opening therein which adapts the cabinet for direct relationship with the electric meter M. The cabinet has an openable front cover 75 which is shown as being hinged at 76, 76 to the bottom end wall 73 and which is normally held closed by a latch at 77. The cover has a slot 78 therein through which the operating handle 12 extends.

In Figs. 7 to 11 I have shown another appliance embodying the broad invention, this being similar in broad general principles to that shown in Figs. 1 to 6 but differing therefrom in certain important structural features.

The main base which carries the circuit-controlling means is at the front instead of at the rear and this base serves not only to support the said circuit-controlling means at the rear thereof, but also to support the meter-testing facilities at the front thereof. The enclosing cabinet may be the same or substantially the same as that already described.

The main base is shown in the drawings at $1^a$, the main body of the base being spaced forward from the rear wall 70 of the cabinet as clearly shown in Figs. 9 and 10. The base preferably has at the bottom an extension $1^b$ which may be integral with the main body of the base. This extension $1^b$ extends rearward into engagement with the rear wall 70 of the cabinet or at least into engagement with an insulating plate $70^a$ mounted at the front of the said rear wall. Interposed between the rear wall of the cabinet and the base near the upper part of the latter, are two supporting blocks $2^a$, $2^a$ preferably formed of insulating material. The base is held in place by means of screws $1^c$, $1^c$ and $1^d$, $1^d$ extending rearward into the threaded holes in the rear wall 70 of the cabinet.

Referring particularly to Figs. 7, 9 and 11, there is provided a standard $6^a$ which carries all of the movable parts of the appliance. This standard $6^a$ comprises two side plates $7^a$, $7^a$ which are flanged at the front and which are held in spaced relationship to each other. The standard $6^a$ may be secured in place on the base $1^a$ by means of screws $8^a$ extending rearward into the flanges on the side plates $7^a$, $7^a$.

Carried by the standard $6^a$ is a movable supporting and operating element in the form of a shaft $10^a$ rotatably supported by the side plates $7^a$, $7^a$. For moving the shaft $10^a$ there is provided an operating means including a handle $12^a$ which projects forward through an opening in the base $1^a$. This handle is pivoted at $33^a$ between forward offset extensions $7^b$, $7^b$ formed integrally with the plates $7^a$, $7^a$. The handle $12^a$ has a rearward extension $34^a$ as shown most clearly in Figs. 9 and 11. Projecting radially from the shaft $10^a$ is an arm $38^a$. A link $35^a$ is pivotally connected at $36^a$ with the handle extension $34^a$ and is pivotally connected at $37^a$ with the arm $38^a$. Movement of the handle and operating mechanism is limited by the pin $39^a$ extending through a slot $40^a$ in the handle extension $34^a$. The handle is biased for movement in the downward or circuit-opening direction by a spring $41^a$.

I have shown two circuit-controlling means located at the respective sides of the standard $6^a$. Carried by the base $1^a$ at each side thereof are two stationary electric contacts $4^a$ and $5^a$, these being spaced apart transversely and adapted to be engaged by movable contacts of the corresponding circuit breaker mechanism. Each of the contacts $4^a$ and $5^a$ comprises a flat strip of metal bent as shown and having the contact face thereof located in a transverse plane. The contacts are easily removable, being held in place by means of nuts on screws $4^b$ and $5^b$.

Rotatably mounted on the shaft $10^a$ is a contact member which includes two spaced side plates $14^a$, $14^a$ preferably formed of insulating material. Two laterally projecting movable contacts $16^a$ and $17^a$ are carried by the contact member at the sides thereof, these contacts projecting laterally from the respective side plates $14^a$, $14^a$ and being adapted to be engaged with and disengaged from the respective stationary contacts $4^a$ and $5^a$ which have already been described. The construction and mounting of the contacts $16^a$ and $17^a$ may be the same as that already described in connection with the contacts 16 and 17. Associated with each contact member is an actuator $20^a$, this being positioned between the side plates $14^a$, $14^a$ and being rigidly secured to the shaft $10^a$ by means of a retaining screw $31^a$. The details of the actuator $20^a$ may be the same as those already described for the actuator 20. Each contact member is biased for movement in the circuit opening direction, in this case in the clockwise direction, by means of a spring $30^a$ surrounding the shaft $10^a$. The spring is engaged at one end with the corresponding side plates $7^a$ and at the other end with the inner one of the two spaced side plates $14^a$, $14^a$.

Mechanically and electrically connected with the movable contacts $16^a$ and $17^a$ is an electro-thermally responsive bi-metallic strip $26^a$ which is or may be similar in construction to the bi-metallic strip 26 already described. The cooperative relationship between the strip $26^a$ and the actuator $20^a$ is the same as the relationship between the strip 26 and the actuator 20 and repetition of description is unnecessary.

As already pointed out the contact members are biased for movement in the opening direction, that is, in the clockwise or opening direction by means of the spring $30^a$, $30^a$. The said contact members are additionally urged in the opening direction by means of the resiliency of the stationary contacts $4^a$ and $5^a$. When the actuating member is in its closed-circuit position as shown in Figs. 10 and 11 the two toggle links $34^a$ and $35^a$ occupy the positions shown with the pivotal axis at $36^a$ below a straight line connecting the pivotal axes at $33^a$ and $37^a$. Downward movement of the links is prevented by the stop pin $39^a$ and thus the two links $34^a$ and $35^a$ constitute a restraining means positively resisting the tendency of the contact members to automatically move in the clockwise or opening direction.

The spring $41^a$ tends to move the handle $12^a$ in the counter-clockwise direction and therefore tends to move the links $34^a$ and $35^a$ in the direction to break the toggle. The said links are held in their locking position by reason of the pressure exerted on the actuating members by the two springs $30^a$, $30^a$ acting through the contact members and the thermal strips $26^a$, $26^a$. Obviously this pressure must be so related to the tension of the spring $41^a$ that it will normally overcome the tendency of the said spring to move the links out of their locking position.

By means of the handle $12^a$ the actuating member and all of the contact members can be moved, while remaining in fixed relationship with each other, to their open-circuit positions. It will be understood that during such movement the thermal strips $26^a$, $26^a$ remain in engagement with the respective actuators $20^a$, $20^a$, and that thus the handle $12^a$ can be used to operate the circuit breaker as a switch to open and close the circuit for ordinary switching purposes. The clockwise opening movement of each contact member is limited by the engagement of the side plates $14^a$, $14^a$ with the insulating plate $70^a$. When the current in either strip $26^a$ exceeds a predetermined amount the strip will be deflected forward and upward and will disengage the actuator $20^a$, thus breaking the mechanical connection between the actuator and the contact member. As soon as this mechanical connection is broken the contact member is immediately turned in the clockwise direction under the action of the corresponding spring $30^a$ to the open-circuit position, the circuit being thus broken in two places.

As already stated, the spring $41^a$ is of such strength as to be insufficient to break the toggle at $34^a$, $35^a$ when both of the contact members are biased in the opening direction by reason of the action of the springs $30^a$, $30^a$ and of the resilient contacts $4^a$, $4^a$ and $5^a$, $5^a$. However, when either of the thermal strips $26^a$, $26^a$ acts to disengage the actuating member and release the corresponding contact member, the pressure upon the toggle links is reduced. The strength of the spring $41^a$ is such that, upon the reduction of pressure resulting from the electro-responsive release of any one contact member, it immediately acts to move the actuating member and each remaining contact member to their open-circuit positions.

Preferably each block $2^a$ serves not only as a means for partly supporting the base $1^a$ but also as the support for an arc extinguishing means. As shown most clearly in Fig. 8 each block $2^a$ is provided with dovetail slots $2^b$, $2^b$ at the opposite sides thereof. Fitted within the slots $2^b$, $2^b$ are alternately arranged metallic plates $2^c$ and insulating spacing pieces $2^d$. The slots $43^a$ between the plates $2^c$, $2^c$ constitute arc rupturing chambers similar to the chambers 43, 43 already described.

Cooperating with the base $1^a$ and with the blocks $2^a$, $2^a$ for enclosing the respective circuit-controlling device I preferably provide baffle plates $3^a$, $3^a$ and $3^b$, $3^b$. These are positioned vertically and are located at the respective sides of the circuit-controlling devices. The baffle plates enter slots in the base $1^a$ and are thus held in place.

The main base $1^a$ constitutes an insulating body normally disposed at the front of the circuit-controlling means. As already pointed out in conjunction with the first described appliance, the insulating body at the front of the circuit-controlling means is utilized for the support of certain meter-testing facilities. In Figs. 7 and 10 I have shown meter-testing facilities similar to those already described and adapted to be similarly used.

On the front of the base $1^a$ at each side thereof there are mounted two vertical straps $57^a$ and $58^a$ held in place by screws $59^a$ and $60^a$. Also mounted on the base $1^a$ in vertical alignment with the straps $57^a$ and $58^a$ are other vertical straps $61^a$ and $62^a$, held in place by screws $63^a$ and $64^a$. The straps $57^a$ and $58^a$ are spaced from the straps $61^a$ and $62^a$, but they are normally electrically connected therewith by means of removable test links $67^a$ and $68^a$ normally held in place by means of nuts engaging the screws $59^a$, $60^a$ and $63^a$, $64^a$.

Provision is made for connecting the said straps $57^a$, $58^a$ and $61^a$, $62^a$ in circuit with the before described circuit-controlling means and also in circuit with the meter. When there are two separate circuit-controlling means and two separate sets of meter-testing facilities as here shown and described, the parts $58^a$, $68^a$ and $62^a$ which are nearer the center of the appliance are preferably connected on the load side of the meter and the parts $57^a$, $67^a$ and $61^a$ which are nearer the side of the appliance, are preferably connected on the service side of the meter. Preferably the circuit-controlling appliance is connected on the service side of the meter between the incoming service wire and the service side straps $57^a$, $67^a$ and $61^a$. Electrically connected with each stationary contact $5^a$ is a conducting plate $5^c$ which is electrically and mechanically connected with the strap $57^a$ by means of the screw $59^a$ and also by a second screw $51^a$.

For the attachment of service wires, terminals $44^a$, $44^a$ and $45^a$, $45^a$ may be secured to the lower part of the base $1^a$. The terminals $44^a$, $44^a$ are connected with the respective stationary contacts $4^a$, $4^a$ by means of vertical conducting straps $44^b$. The terminals $45^a$ are directly connected with the corresponding straps $58^a$. The terminals $44^a$, $44^a$ may be regarded as adapted for a connection of service wires S, S and the terminals $45^a$, $45^a$ may be regarded as adapted for the connection of load wires L, L. For a three wire circuit there may be additional terminals $48^a$ and $49^a$ adapted for the connection of additional service and load wires forming the third or neutral connection. Wire terminals 53ᵃ and 54ᵃ are mounted on the front of the base 1ᵃ at the top thereof, being adapted to be connected respectively with the service and load sides of the meter. The terminals 53ᵃ and 54ᵃ are electrically connected respectively with the vertical straps 61ᵃ and 62ᵃ.

From an inspection of Figs. 1 and 3 it will be evident that when the circuit breaker mechanism is in closed position a circuit is established from each service wire terminal 44ᵃ through the conductor 44ᵇ and through the stationary and movable contacts of the circuit breaker proper to the plate 5ᵇ. From the plate 5ᵇ the circuit extends through the parts 57ᵃ, 67ᵃ, 61ᵃ and 53ᵃ to the meter. From the meter the circuit extends through the parts 54ᵃ, 62ᵃ, 68ᵃ and 58ᵃ to the load wire terminal 45ᵃ.

By putting in place a by-pass link between the screws 51ᵃ and 52ᵃ as indicated by dot-and-dash lines at A in Fig. 7, the current can be by-passed from the service wire to the load wire without going through the meter. It will be observed however that the by-passing between the screws 51ᵃ and 52ᵃ leaves the circuit breaker in the circuit, thus providing protection for the customer during testing and making it possible to manually control the customer's circuit during testing if desired. One or the other or both of the meter terminals may be freed for testing by removing or the other or both of the links 67ᵃ and 68ᵃ in accordance with well known practice. The screws 59ᵃ, 60ᵃ and 63ᵃ, 64ᵃ and the nuts thereon serve as means for the attachment of conductors serving to connect with a standard test meter or other meter testing instrumentalities.

What I claim is:

1. An electric meter service appliance comprising in combination, wire terminals for the attachment respectively of service and load wires, other wire terminals for the attachment of meter wires so that a meter may be electrically connected between the service and load terminals, a circuit-controlling means connectible in series with the meter between the service and load terminals and operable manually to open and close the circuit and automatically to open the circuit upon the attainment of abnormal current conditions, an insulating body normally disposed at the front of the said circuit-controlling means, and meter-testing facilities connectible in series with the meter and with the said controlling means between the service and load terminals and mounted upon the insulating body directly in front of the circuit-controlling means.

2. An electric meter service appliance as set forth in claim 1, wherein the circuit-controlling means includes two contacts of which one is biased to an open-circuit position and includes an electro-responsive device for automatically releasing the last said contact upon the attainment of abnormal current conditions.

3. An electric meter service appliance comprising in combination, a base, wire terminals for the attachment respectively of service and load wires, other wire terminals for the attachment of meter wires so that a meter may be electrically connected between the service and load terminals, circuit-controlling means on the base connectible in series with the meter between the service and load terminals and manually operable to open and close the circuit, a front cover for the circuit-controlling means removably connectible with the base, and meter-testing facilities connectible in series with the meter and with the said controlling means between the service and load terminals and mounted upon the removable cover.

4. An electric meter service appliance as set forth in claim 3, wherein the circuit-controlling means includes two normally engaged but separable contacts and also includes an electro-responsive device for automatically effecting the separation of the contacts upon the passage of excess current, and wherein there are included means whereby the contacts may be manually reengaged after automatic operation.

5. An electric meter service appliance as set forth in claim 3, wherein the removable cover is formed of insulating material so that the body of the cover serves as the insulating means for directly supporting the several parts of the meter-testing facilities.

6. In an electric meter service appliance comprising a base and conducting elements thereon including a circuit-controlling means operable to open and close the circuit, the combination with the parts aforesaid of a front cover for the circuit-controlling means removably connectible with the base, meter-testing facilities mounted on the removable cover, and disconnectible conducting means serving to electrically connect the meter-testing facilities with the conducting elements on the base when the cover is in its normal position.

7. An electric meter service appliance as set forth in claim 6, wherein the conducting elements on the base include wire terminals electrically separate from the circuit-controlling means, and wherein there are disconnectible conducting means serving to electrically connect the meter-testing facilities with the said wire terminals when the cover is in its normal position.

8. An electric meter service appliance as set forth in claim 6, wherein the conducting elements on the base include wire terminals electrically separate from the circuit-controlling means, and wherein disconnectible connecting means are provided for holding the cover in place which connecting means also serve to electrically connect the meter-testing facilities with the said wire terminals when the cover is in its normal position.

9. An electric meter service appliance as set forth in claim 6, wherein the removable cover is open at one end, wherein there is a stationary body positioned on the base to normally close the space at the open end of the cover, and wherein there is a wire terminal on the said stationary body disconnectibly connected with the said meter-testing facilities when the cover is in its normal position.

10. In an electric meter service appliance comprising a base and conducting elements thereon including a circuit-controlling means manually operable to open and close the circuit, the combination with the parts aforesaid of a front cover for the circuit-controlling means removably connectible with the base, meter-testing facilities mounted on the removable cover, a member extending forward from the base through a hole in the cover and electrically connected at the rear with one of the conducting elements, and means releasably engaging the said member at its forward end to electrically connect it with the meter-testing facilities and to assist in mechanically holding the cover in place.

11. An electric meter service appliance as set forth in claim 10, wherein the conducting elements on the base also include a wire terminal electrically separate from the controlling means, and wherein there are two similar forward extending members and two similar releasable engaging means, the said members being electrically connected at the rear respectively to the said controlling means and to the said separate wire terminal.

12. In an electric meter service appliance, the combination of a circuit-controlling means operable manually to open and close the circuit, service and load wire terminals, meter wire terminals adapted for the connection of a meter between the service and load wire terminals and in series with the circuit-controlling means, meter-testing facilities electrically connectible between the meter and the load wire terminal and adapted to interrupt the circuit connection between them, by-pass means associated with the meter-testing facilities and adapted to establish a connection independent of the meter from the load side of the circuit-controlling means to the load wire terminal, and a second by-pass means adapted to establish a connection independent of the circuit-controlling means from the service wire terminal to the load wire terminal.

13. An electric meter service appliace as set forth in claim 12, wherein the second by-pass means is adapted to establish a connection from the service wire to the load wire which is not only independent of the circuit-controlling means but is also independent of the meter.

14. An electric meter service appliance as set forth in claim 12, wherein there is a removable cover for the circuit-controlling means and wherein the meter-testing facilities and the first by-pass means are mounted on the removable cover.

15. An electric meter service appliance comprising in combination, an insulating base, wire terminals for the attachment respectively of service and load wires, other wire terminals for the attachment of meter wires so that a meter may be electrically connected between the service and load terminals, a circuit-controlling means carried by the base at the rear thereof and connectible in series with the meter between the service and load terminals, the said circuit-controlling means being operable manually to open and close the circuit and automatically to open the circuit upon the attainment of abnormal current conditions, and meter-testing facilities connectible in series with the meter and with the said controlling means between the service and load terminals and mounted upon the front of the base directly in front of the circuit-controlling means.

16. An electric meter service appliance as set forth in claim 15, wherein the circuit-controlling means includes two contacts of which one is biased to an open-circuit position, and includes an electro-responsive device for automatically releasing the last said contact upon the attainment of abnormal current conditions.

In testimony whereof I have hereunto set my hand this 28th day of July, 1930.

JOSEPH SACHS.